US006341213B1

(12) United States Patent
Wu

(10) Patent No.: US 6,341,213 B1
(45) Date of Patent: Jan. 22, 2002

(54) DYNAMIC REPEATER CONFIGURATION FOR MULTILINK SATELLITE SYSTEMS WITH ROBUST SUBCHANNEL INTERCONNECT CAPABILITY

(75) Inventor: Shih-Chang Wu, Alhambra, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/372,532

(22) Filed: Aug. 11, 1999

(51) Int. Cl.[7] .............................. H04Q 7/20; H04Q 7/36
(52) U.S. Cl. ..................... 455/12.1; 455/13.3; 455/427; 455/428; 455/13.4; 455/11.1; 370/316; 370/323; 370/322; 342/358; 342/352
(58) Field of Search ................................ 455/12.1, 13.3, 455/13.4, 427, 428, 20, 22, 429, 430, 11.1, 15; 370/316, 323, 322, 315, 916; 342/358, 359, 368, 352

(56) References Cited

U.S. PATENT DOCUMENTS 5,642,358 A * 6/1997 Dent .......................... 370/323
5,822,312 A * 10/1998 Peach et al. ................. 370/323
6,249,514 B1 * 6/2001 Campanella ................. 370/316
6,266,329 B1 * 7/2001 Lazaris-Brunner et al. . 370/316

* cited by examiner

Primary Examiner—William Trost
Assistant Examiner—Keith Ferguson
(74) Attorney, Agent, or Firm—Gates & Cooper LLP

(57) ABSTRACT

A dynamic repeater configuration for satellite systems is disclosed that allows for multiple broadcast of channel information and multiple subchannel allocations on uplink and downlink beam signals. The apparatus comprises an input multiplexer, a subchannel routing switch matrix, a channel routing switch matrix, and an output multiplexer. The input multiplexer receives the uplink signal and produces at least a first channel signal therefrom. The subchannel routing switch matrix receives the uplink signal, separates at least one channel signal into at least one subchannel, routes the subchannel from a selected uplink subchannel into a selected downlink subchannel, and recombines the selected downlink subchannels into a second channel signal. The channel routing switch matrix routes the first channel signal into a first downlink channel signal and the second channel signal into a second downlink channel signal. The output multiplexer combines the first and second downlink channels into the downlink signal.

14 Claims, 12 Drawing Sheets

DYNAMIC REPEATER CONFIGURATION FOR MULTILINK SATELLITE SYSTEMS WITH ROBUST SUBCHANNEL INTERCONNECT CAPABILITY

CROSS-REFERENCE TO RELATED APPLICATIONS

This application is related to application Ser. No. 09/193,947, entitled "RECONFIGURABLE ANALOG CHANNEL PROCESSOR FOR MULTIBEAM SATELLITES," filed on Nov. 18, 1998, by Shih-Chang Wu, et al., which application is incorporated by reference herein.

BACKGROUND OF THE INVENTION

1. Field of the Invention

This invention relates in general to multibeam satellite switching networks, and, in particular, to a dynamic repeater configuration for multilink satellite systems with subchannel interconnect capability.

2. Description of Related Art

Communications satellites are operated in various modes. Some satellites operate as simple repeaters, typically known as a "bent-pipe" configuration, where the uplink signal is merely repeated, at a different frequency, in a downlink signal. No processor capability is available onboard the satellite other than frequency translation between the uplink and downlink signals, and, if necessary, amplification of the downlink signal to allow ground based receivers to receive the signal.

Multi-beam satellites were introduced to allow the satellite to receive signals from multiple sources and relay those signals to multiple destinations. In a multi-beam satellite, however, the ability of the satellite to relay a given uplink signal to a desired downlink destination was still limited.

To help to reduce this limitation, multi-beam satellites that have on-board switching capability have been deployed. These satellites receive an incoming beam containing several frequency-multiplexed channels, demultiplex (demux) the signal on-board the satellite, and inter-beam switch these channels into a desired downlink beam.

The multi-beam switching satellites, however, are still limited in their switching capabilities. A subchannel of a given uplink frequency must still be located at the same relative frequency in any one of the subchannels of the downlink frequency. Further, channels are limited in the same manner, i.e., a channel of a given uplink frequency must be located at the same relative frequency in the downlink frequency. These limitations are undesirable because they limit the multiplexing of uplink and downlink channels and subchannels for flexibility in providing communication services to geographically diverse satellite ground stations.

Further, the present multi-beam switching satellites are limited in that an uplink channel or subchannel can only be routed to a single downlink channel, and an uplink subchannel can only be routed to a single downlink subchannel. This limitation further reduces the flexibility of the satellite communications.

It can be seen, then, that there is a need in the art for a multi-beam switching satellite that can multiplex any uplink channel or subchannel into any downlink channel or subchannel frequency slot. It can also be seen, then, that there is a need in the art for increased flexibility in the subchannel interconnections between uplink frequencies and downlink frequencies. It can also be seen that there is a need in the art for a multiplexer system that can route an uplink channel or subchannel into multiple downlink channels or subchannels, respectively.

SUMMARY OF THE INVENTION

To overcome the limitations in the prior art described above, and to overcome other limitations that will become apparent upon reading and understanding the present specification, the present invention discloses a dynamic repeater configuration for multi-link satellite systems. A dynamic repeater configuration for satellite systems is disclosed that allows for multiple broadcast of channel information and multiple subchannel allocations on uplink and downlink beam signals. The apparatus comprises an input multiplexer, a subchannel routing switch matrix, a channel routing switch matrix, and an output multiplexer. The input multiplexer receives the uplink signal and produces at least a first channel signal therefrom. The subchannel routing switch matrix receives the uplink signal, separates at least one channel signal into at least one subchannel, routes the subchannel from a selected uplink subchannel into a selected downlink subchannel, and recombines the selected downlink subchannels into a second channel signal. The channel routing switch matrix routes the first channel signal into a first downlink channel signal and the second channel signal into a second downlink channel signal. The output multiplexer combines the first and second downlink channels into the downlink signal.

As further flexibility in the repeater system becomes necessary, additional hardware can be added, or the configuration can be rearranged, to allow for the channels and subchannels to be reconfigured, e.g., multiple subchannel allocations, broadcast of a single uplink channel into multiple downlink slots, and other options.

An object of the present invention is to provide a multi-beam switching satellite that can multiplex any uplink channel or subchannel into any downlink channel or subchannel frequency slot. A further object of the invention is to provide increased flexibility in the subchannel interconnections between uplink frequencies and downlink frequencies. A further object of the invention is to provide a multiplexer system that can route an uplink channel or subchannel into multiple downlink channels or subchannels, respectively.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
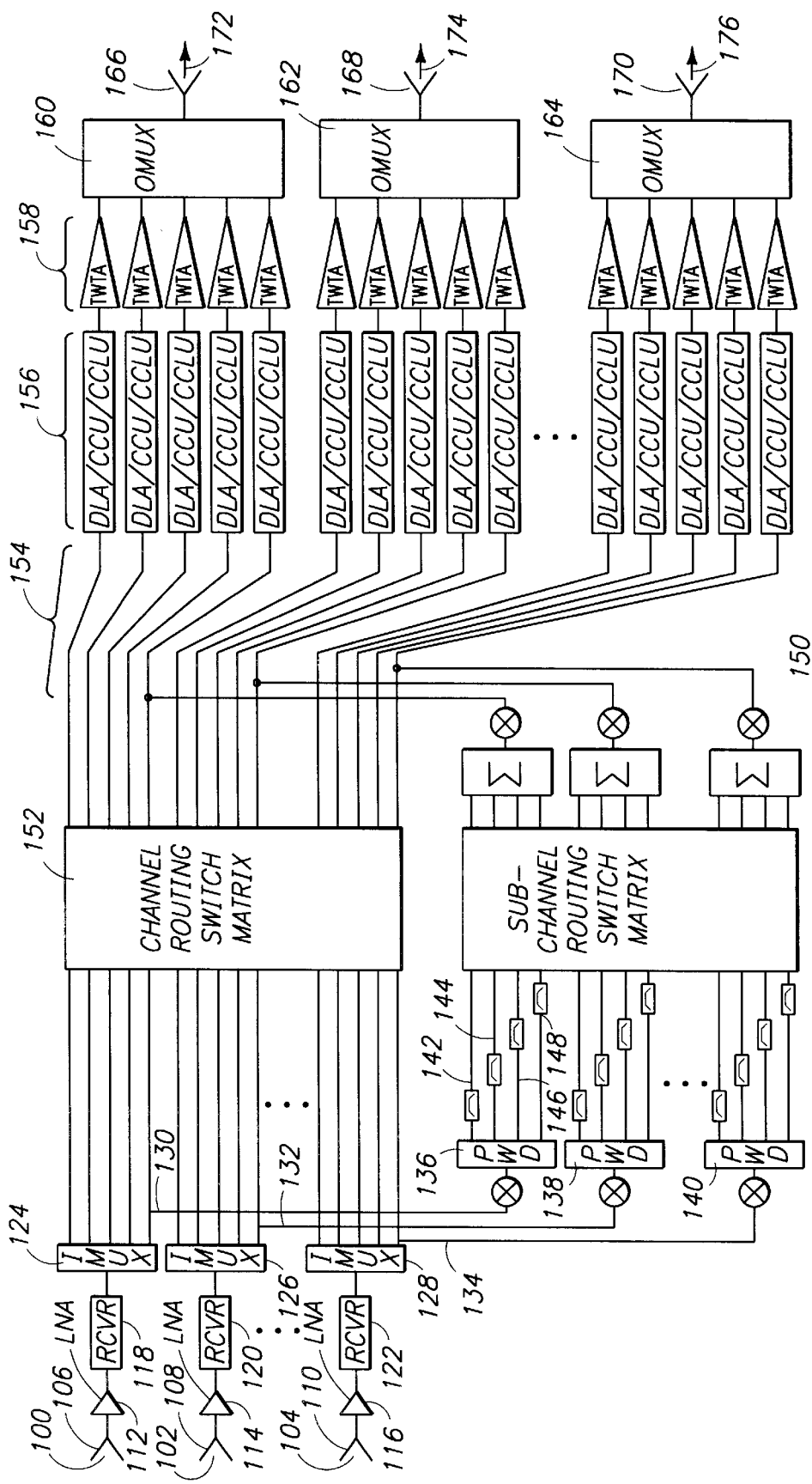
FIG. 1 illustrates a repeater system as used in the prior art.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.
Prior Art Multibeam Satellite Systems FIG. 1 illustrates a repeater system as used in the prior art. As shown in FIG. 1, corresponding to European Patent No. EP0760561A2, entitled "Repeaters For Multibeam Satellites With Channels Divided In Subchannels And Interbeam Switching," which is herein incorporated by reference, uplink beam signals 100–104 are received by antennas 106, 108, and 110, and then, as necessary, the beam signals 100–104 are amplified by Low Noise Amplifiers (LNAs) 112, 114, and 116. The uplink beam signals 100–104 are also referred to as "received uplink signals." As shown, there can be more uplink beam signals 100–104, but, for illustration purposes only, three uplink beam signals 100–104 are shown. Each beam signal 100–104 could be received at a common antenna 100, and then divided by means of duplexers or filters if desired. The LNA 112–116 outputs are then fed into receivers 118–122, which passes beam signals 100–104 to the input multiplexers (IMUX) 124–128.

The IMUX 124–128 separate each beam signal 100–104 into channels. This separation is done by frequency, e.g., if the beam channel has a frequency bandwidth of 300 MHz, and there are five channels, each channel uses 60 MHz of the frequency bandwidth to transmit information. As shown, each IMUX 124–128 separates the uplink beam signal 100–104 into five channels. There can be a greater or lesser number of channels per uplink beam signal 100–104 as needed.

Some of the outputs of the IMUX 124–128 are coupled to a secondary multiplexer system. Full channel signals 130–134 are coupled to power dividers (PWDs) 136–140, which further subdivide a full channel signal 130–134 into subchannel signals. For example, full channel signal 130 can be divided into subchannel signals 142–148. There can be a larger or smaller number of subchannel signals 142–148 for each full channel signal 130 that is routed to the PWDs 136–140, depending on the design of the satellite.

Subchannel signals 142–148, along with any other full channel signals 130–134 that have been divided into subchannels, are filtered and are then fed into subchannel routing switch matrix 150, which includes summing devices to reconstruct the subchannel signals back into a channel signal. The remaining output signals from IMUXs 124–128 are fed into channel routing switch matrix 152. The subchannel routing switch matrix 150 and the channel routing switch matrix 152 then rearrange the channels and subchannels into downlink channels 154 for transmission to ground stations. The subchannel routing switch matrix 150 summing device sums the subchannel signals into channel signals, and forwards these channel signals on to the remainder of the system. This rearrangement is further discussed with respect to FIG. 2.

Once rearranged, the downlink slots (channels) 154 are amplified by Driver-Limiter Amplifiers (DLA), and controlled by channel control units (CCU/CCLU) 156. This signal is then amplified by Traveling Wave Tube Amplifiers (TWTA) 158. The amplified signals are then fed into Output Multiplexers (OMUXs) 160–164 that combine the channel signals 154 properly, sent the combined channel signals 154 to antennas 166–170, and transmit these signals 154 back to ground stations as downlink beam signals 172–176.

When herein describing the uplink beam signals 100–104 and downlink beam signals 172–176, the initial subdivisions of the uplink beam signals 100–104 will be referred to as "channels," whereas the initial subdivisions of the downlink beam signals 172–176 will be referred to as "slots," even though the downlink beam signals 172–176 contain channels just as the uplink beam signals 100–104 do. This terminology allows for the mapping of a channel of an uplink beam signal 100–104 into a slot of a downlink beam signal 172–176 while still being able to refer to the origin of the signal in the downlink beam signal 172–176 slot, e.g., the uplink beam signal 100–104 "channel."

Figure 2:
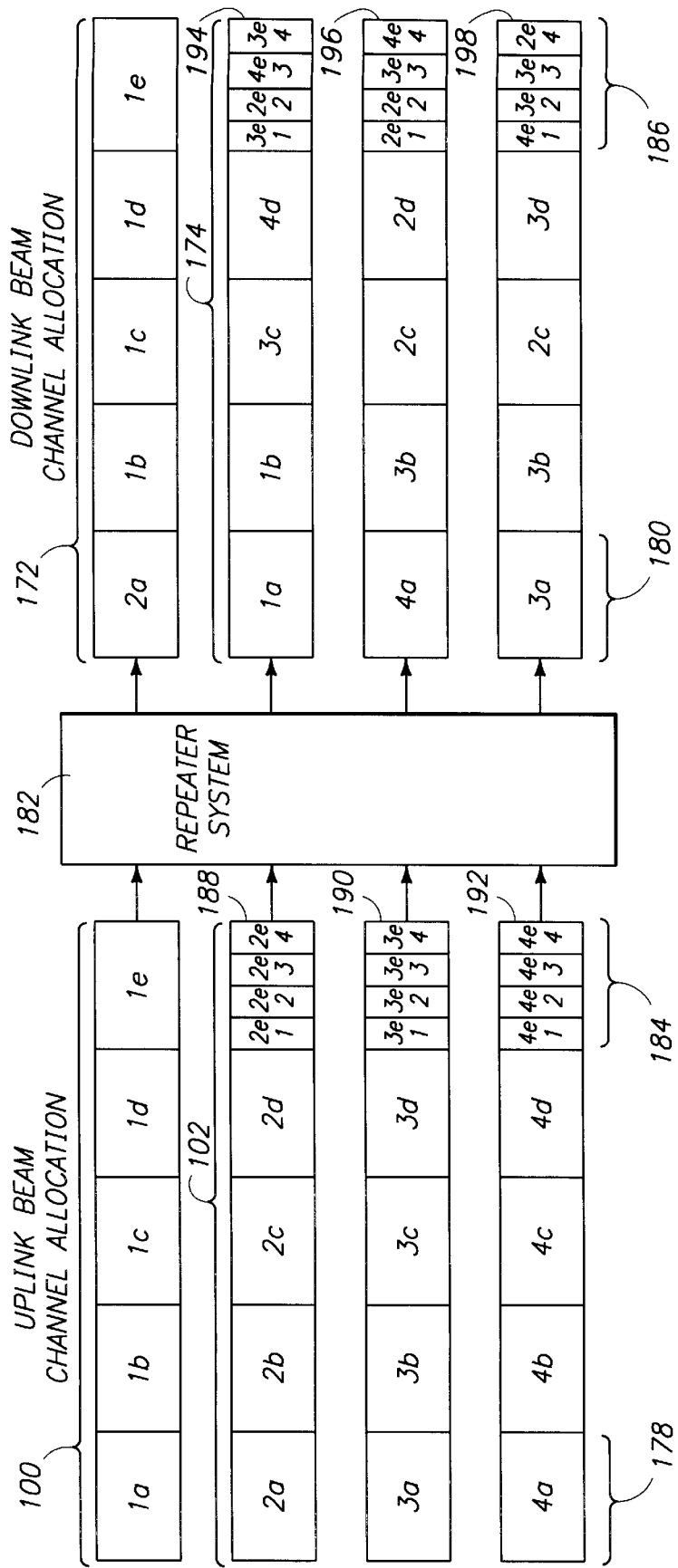
FIG. 2 illustrates the connectivity of the channel routing switch matrix and subchannel routing switch matrix of the prior art.

FIG. 2 illustrates the connectivity of the channel routing switch matrix and subchannel routing switch matrix of the prior art.

As discussed with respect to FIG. 1, the uplink beam signals 100–104 are partitioned into channels. For illustration purposes, each uplink beam signal 100–104 is partitioned into five channels, designated Channel A through Channel E, for each uplink beam signal 100–104.

The limitations of the prior art is that the channel routing switch matrix can only place channels in uplink beam signals 100–104 in the same relative position in downlink beam signals 172–176. For example, Channel A up 178, no matter which uplink beam signal 100–104 the channel A up 178 signal originates from, can only be switched into channel A down 180 of the downlink beam signal 172–176 by the repeater system 182. Further, full channel signals 130–134 can only exist in one of the channels on both the uplink beam signals 100–104 and downlink beam signals 172–176. As shown in FIG. 2, uplink beam signals 100–104 have subchannels only in Channel E up 184; therefore, because of the limitations of the prior art, the downlink beam signals 172–178 can only have subchannels in channel E down 186.

This limitation of not being able to interchange the subchannel frequency (slot) among different uplink beam signals 100–104 to downlink beam signals 172–176 limits the flexibility of the multibeam satellite switching system 182. There is no frequency translation, e.g., Channel A up 178 to Channel E down 186, nor is there any broadcasting of a single uplink channel into multiple downlink slots (channels), e.g., Channel A up 178 into Channel A down 180 and Channel E down 186. Further, the number of subchannel slots in the uplink beam signals 100–104 must equal the number of subchannel slots in the downlink beam signals 172–176, e.g., if, as shown, three channel slots on uplink beam signals 100–104 have subchannels (Channel 2E up 188, Channel 3E up 190, and Channel 4E up 192), then three channel slots on downlink beam signals 172–176 must have subchannels (Slot 2E down 194, Slot 3E down 196, and Slot 4E down 198).

Overview

The present invention removes the limitations of the prior art system described in FIGS. 1 and 2. The present invention allows for interchangeability of channels between uplink and downlink beams, e.g., implements frequency translation, allows for broadcasting of a single uplink channel into multiple downlink slots (channels), and allows for an unequal number of subchannel slots in the uplink beam signals 100–104 and downlink beam signals 172–176. FIGS. 3–12 illustrate and describe the mechanisms that the present invention employs to overcome the limitations of the prior art.

Flexible Subchannel Allocation

Figure 3:
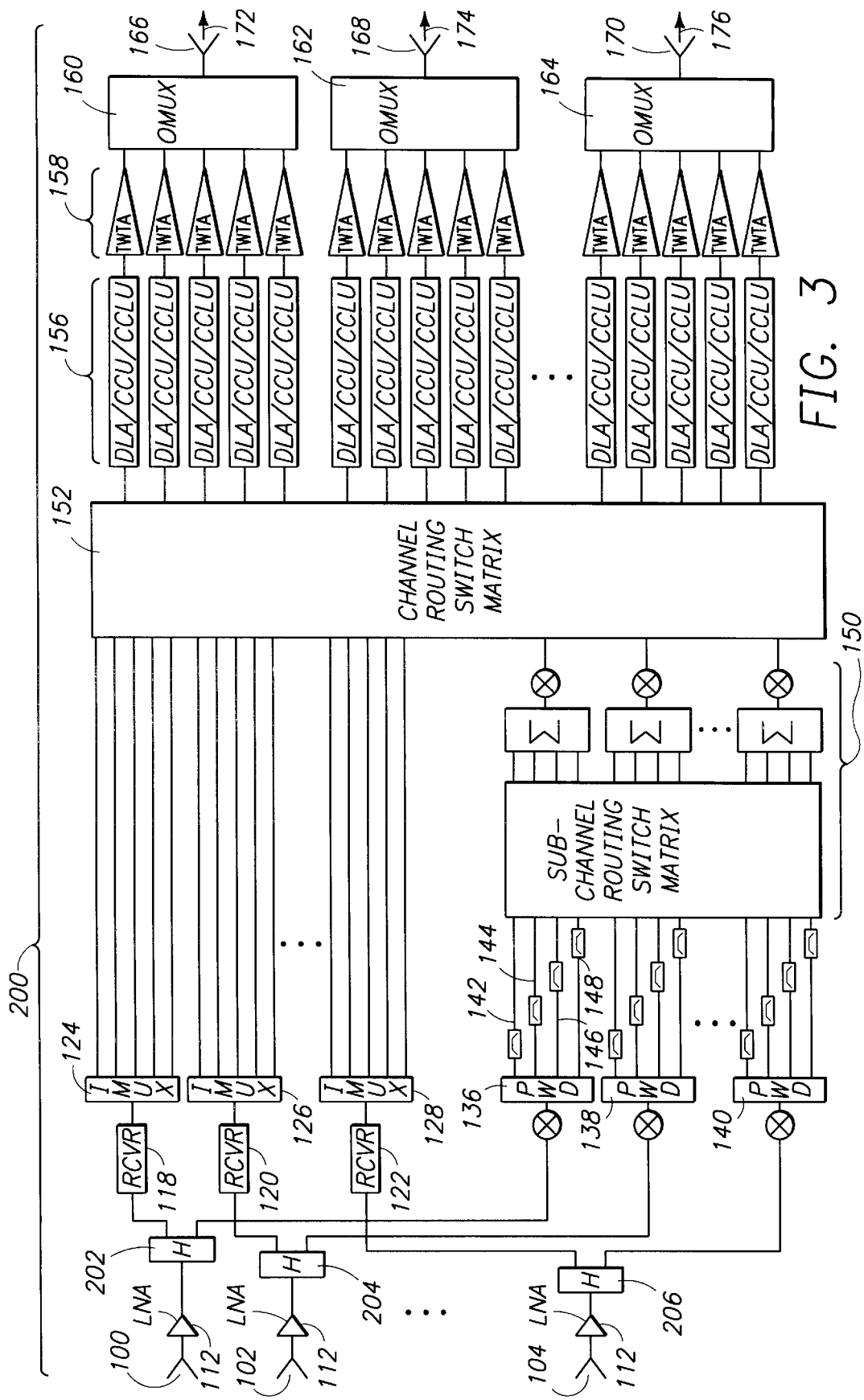
FIG. 3 illustrates an embodiment of the repeater system of the present invention which allows for flexible subchannel allocation among downlink beam signals.

FIG. 3 illustrates an embodiment of the repeater system of the present invention which allows for flexible subchannel allocation among uplink and downlink beam signals.

Repeater system 200 of the present invention utilizes hybrid power dividers 202–206 to route uplink beam signals 100–104 to the subchannel routing switch matrix 150 prior to passing uplink beam signals 100–104 through IMUXs 124–128. The configuration of repeater system 200 allows the present invention to receive subchannels in any channel allocation slot of the uplink beam signals 100–104, instead of only one channel slot of uplink beam signals 100–104, and to route these received subchannels into any slot of downlink beam signals 172–176. As shown in FIG. 2, only Channel E up 184 could contain subchannels because of the limitations of repeater system 182. This limitation is evident in the connection of full channel signals 130–134 connecting to only one channel signal emanating from IMUXs 124–128; because of this, only one channel allocation in uplink beam signals 100–124 can be routed to sub-channel routing switch matrix 150.

The present invention avoids this limitation because the entire uplink beam signal 100–104, not just one channel of the uplink beam signal 100–104, is forwarded to subchannel routing switch matrix 150, and, therefore, the subchannel routing switch matrix can select which channel of uplink beam signal 100–104 is to be further divided into subchannels.

Figure 4:
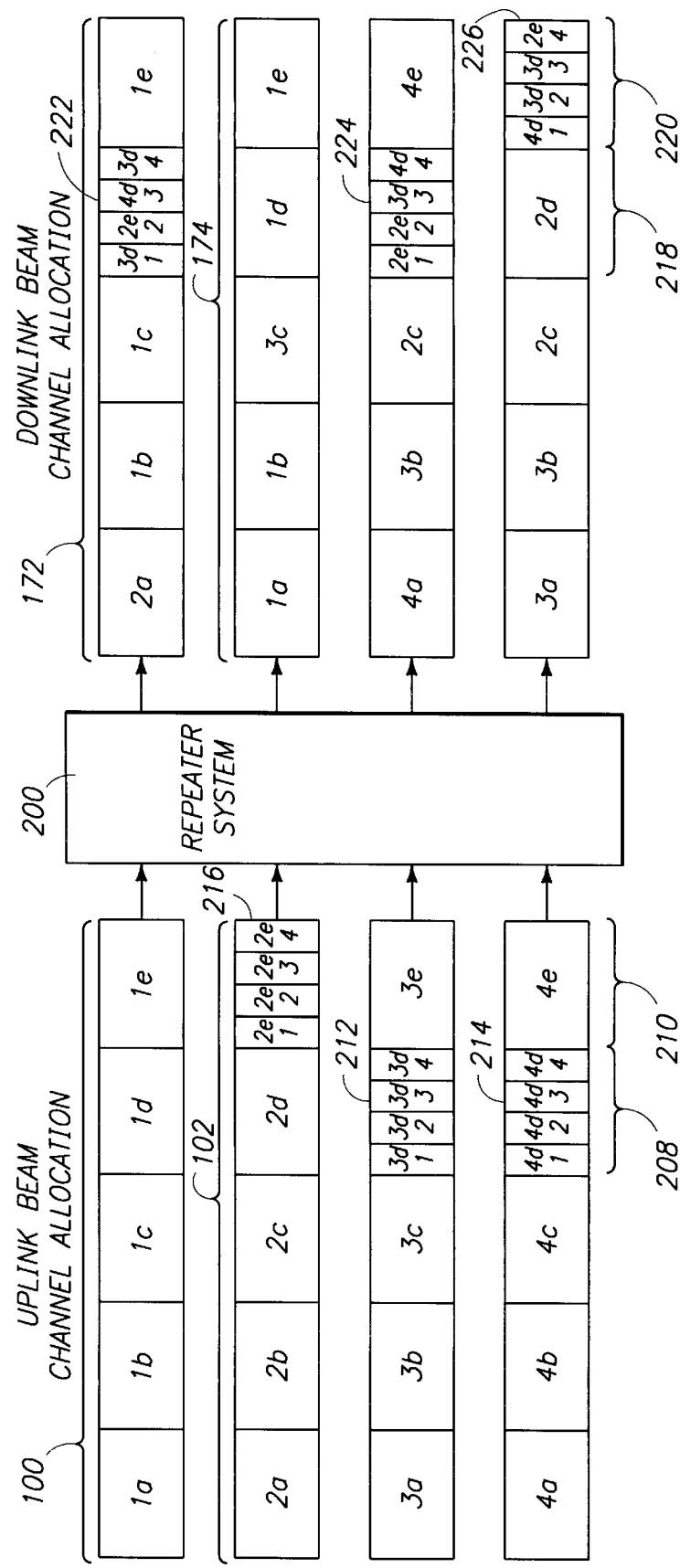
FIG. 4 illustrates the connectivity of the system of the present invention as described in FIG. 3.

FIG. 4 illustrates the connectivity of the system of the present invention as described in FIG. 3. Now, uplink Channel D 208 and uplink Channel E 210 both contain subchannel signals. Uplink Channel D 208 uses beam 3 slot D 212 and beam 4 slot D 214 for subchannel transmission, and uplink Channel E 210 uses beam 2 slot E 216 for subchannel transmission.

The downlink beam channel allocation also allows for subchannels in multiple channel slots. Channel D down 218 and Channel E down 220 both contain subchannel transmissions, e.g., beam 1 slot D 222 contains subchannels from multiple uplink beam signals 100–104, e.g., uplink beam signals 2, 3, and 4. Similarly, beam 3 slot D 224 and beam 4 slot E 226 contain subchannel transmissions which are conglomerations of the subchannels that were transmitted in uplink beam signals 100–104. Note also that subchannels from beam 3 slot D up now appear in multiple beams on the downlink; e.g., beam 1 slot D 222, beam 3 slot D 224 and beam 4 slot E 226. Further, subchannel frequencies can be switched between downlink slot (channel) slots, which is evidenced by beam 3 slot D 212 appearing in both Channel D down 218 and Channel E down 220.

The configuration of FIG. 3 and the connectivity shown in FIG. 4 allow for subchannel transmission to additional downlink antennas 166–170, and, therefore, downlink beam signals 172–176. This additional flexibility provided by the present invention allows for more precise cross-linking of signals from available uplink beam signals 100–104. For example, when one uplink beam signal 100 has been utilized to a maximum capability, but one downlink beam signal 172 requires a subchannel configuration, the system of FIG. 1 cannot accommodate this situation. The present invention, as illustrated in FIG. 3, can switch subchannels from other uplink beam signals 102 or 104 into downlink beam signal 172, as shown in FIG. 4, where beam 3 slot D 212, beam 4 slot D 214, and beam 2 slot E 216 are mapped into beam 1 slot D 222. The flexibility of the present invention requires the addition of power dividers 202–206, and the reconfiguration LO to drive the subchannel mixers.

Frequency Translation Between Uplink And Downlink Signals

Figure 5:
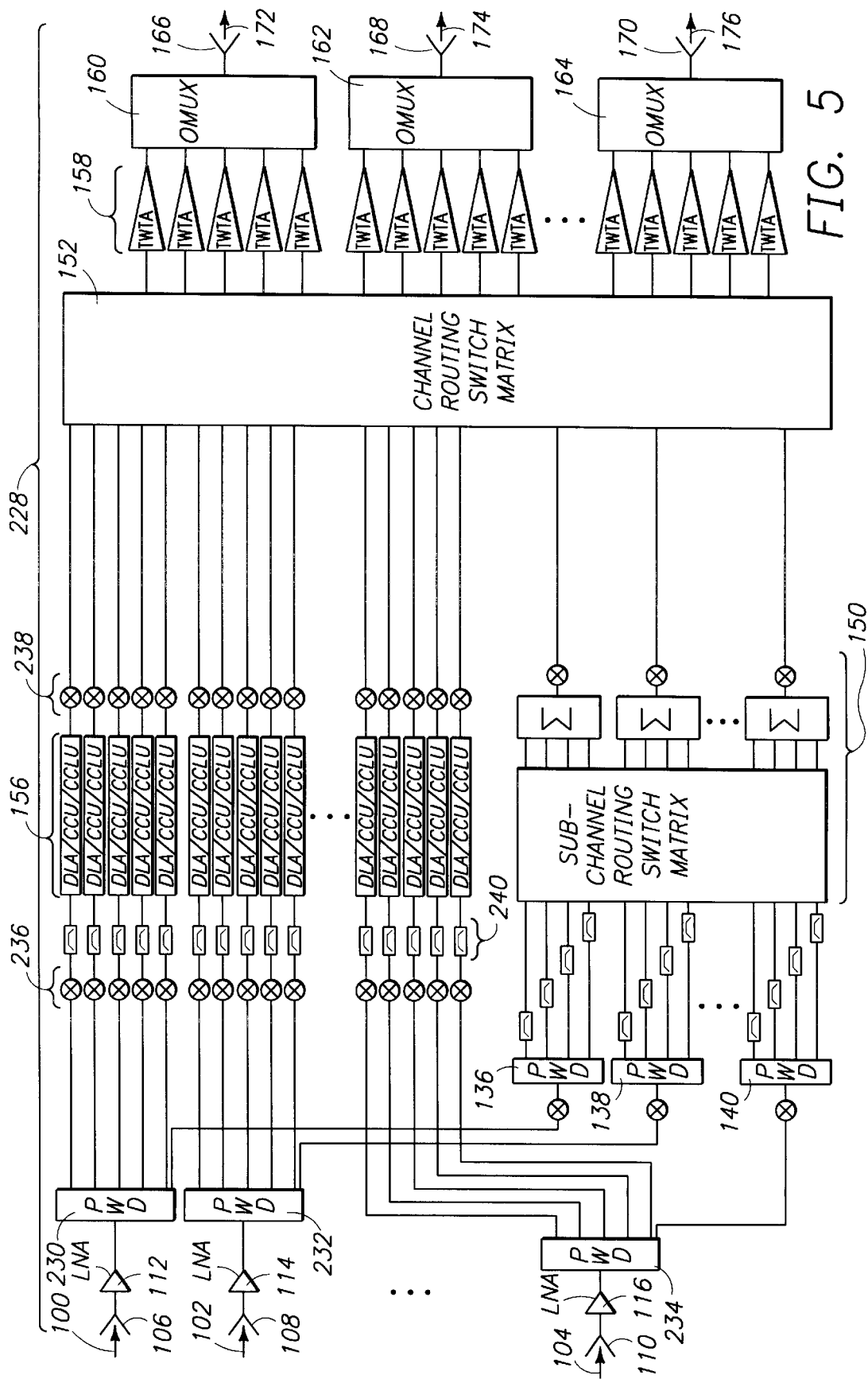
FIG. 5 illustrates an embodiment of the repeater system of the present invention which allows for frequency translation between uplink beam signals and downlink beam signals.

FIG. 5 illustrates an embodiment of the repeater system of the present invention which allows for frequency translation between uplink beam signals and downlink beam signals.

The repeater system 228 of FIG. 5 uses power dividers 230–234, downconverter mixers 236, and upconverter mixers 238, and filters 240 to replace the IMUXs 124–128. In addition, the DLA/CCA/CCLUs 156 have been moved to the input side of the channel routing switch matrix 152. The downconverter mixers 236, upconverter mixers 238, and filters 240 comprise a common intermediate frequency (IF) unit for the repeater system 228.

The entire uplink beam signals 100–104 are still fed into the subchannel routing switch matrix 150 to allow subchannels to appear in any frequency channel slot of the uplink beam signals 100–104 and/or downlink beam signals 172–176.

The configuration shown in FIG. 3 allows the repeater system 228 to frequency translate channel information from a first channel in the uplink beam signals 100–104 to a second channel in the downlink beam signals 172–176. This allows for increased flexibility in locating channels in uplink and downlink signals for repeater system 228 that is not available in repeater system 182 of the prior art.

Figure 6:
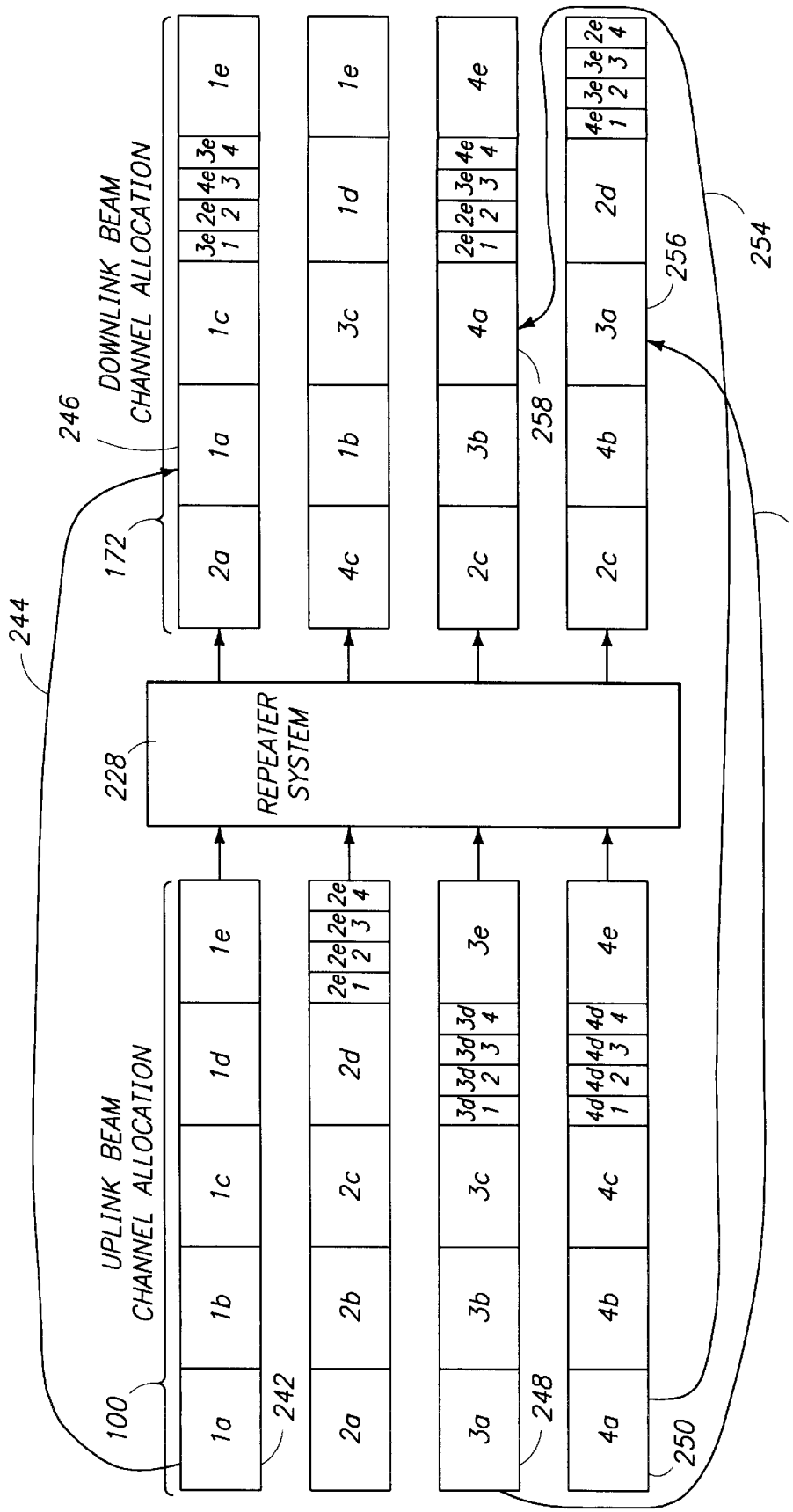
FIG. 6 illustrates the connectivity of the system of the present invention as described in FIG. 5.

FIG. 6 illustrates the connectivity of the system of the present invention as described in FIG. 5.

To illustrate the frequency translation now available using the repeater system 228 described in FIG. 5, uplink beam 1 Channel A 242 is frequency translated via translation path 244 to downlink beam 1 slot B 246. This frequency translation is also shown in beam 3 Channel A 248 and beam 4 Channel A 250 being frequency translated via frequency paths 252 and 254 to beam 4 slot C 256 and beam 3 slot C 258 respectively. Other frequency translations are possible with the repeater system 228; some are shown in the remainder of FIG. 6, and, depending on the programming of the channel routing switch matrix 152 and subchannel routing switch matrix 150, other interconnections between uplink beam signals 100–104 and downlink beam signals 172–176 are possible with the present invention.

Single Uplink Channel to Multiple Downlink Slot (Channel) Translations

Figure 7:
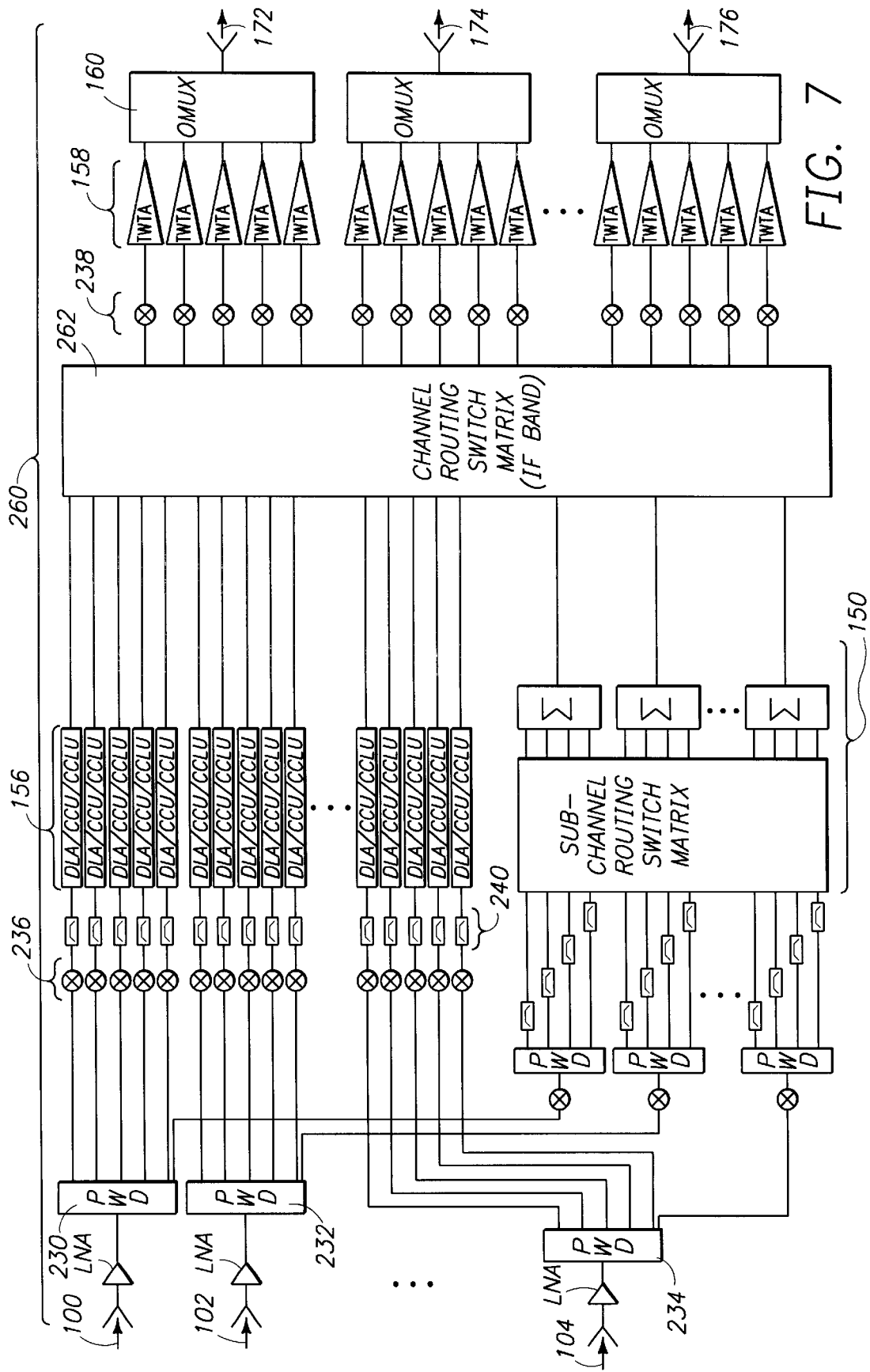
FIG. 7 illustrates a repeater system of the present invention that provides for a single uplink channel to be broadcast into multiple downlink channels.

FIG. 7 illustrates a repeater system of the present invention that provides for a single uplink channel to be broadcast into multiple downlink slots (channels).

To perform this multiple broadcast of a channel, the matrix combination of the channels must be done at a common frequency, also known as an Intermediate Frequency (IF). Therefore, repeater system 260 must perform all matrix combinations at a common IF frequency.

This is done by designing an IF channel routing switch matrix 262, and moving upconverter mixers 238 to the output side of IF channel routing switch matrix 262. The repeater system 260 receives uplink beam signals 100–104, power divides these signals at power dividers 230–234, downconverts the signals to an IF frequency at downconverter mixers 236, filters the signals to separate them into channels using filters 240, and then amplifies and controls the channel separated signals with DLA/CCA/CCLUs 156.

Once those functions are completed, each channel enters the IF channel routing switch matrix 262 at a common IF frequency. The matrix manipulation performed by IF channel routing switch matrix 262 can then send one input signal to as many output ports as desired, because each output port can accept an input from any input of the IF channel routing switch matrix 262. If the channel routing switch matrix is not designed at a common frequency, as was the case with channel routing switch matrix 152, each input port can only feed output ports of common frequency, e.g., Channel A in to Channel A out, etc. With IF channel routing switch matrix 262, that constraint has been removed, because each input port is now frequency compatible with every output port.

Figure 8:
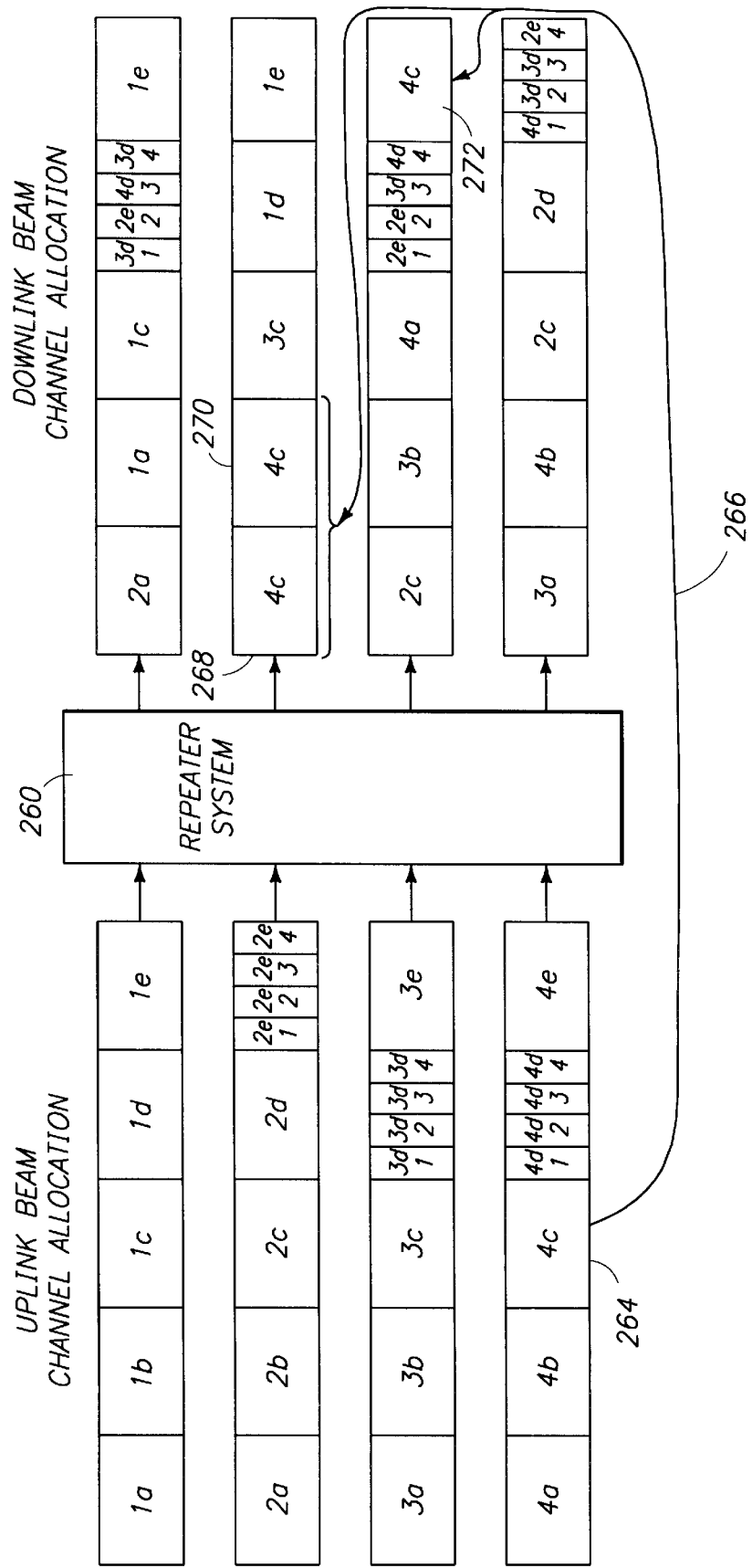
FIG. 8 illustrates the connectivity of the system of the present invention as described in FIG. 7.

FIG. 8 illustrates the connectivity of the system of the present invention as described in FIG. 7.

As shown in FIG. 8, beam 4 Channel C 264 is broadcast via broadcast path 266 into beam 2 slot A 268, beam 2 slot B 270, and beam 3 slot E 272. The frequency translation from beam 4 Channel C 264 to any other slot than "C" in the downlink beam signals 172–176 is not possible unless repeater system 260 utilizes an IF channel routing switch matrix 262, as described in FIG. 7.

Multiple Subchannel Slots In An Uplink or Downlink Beam Signal

Figure 9:
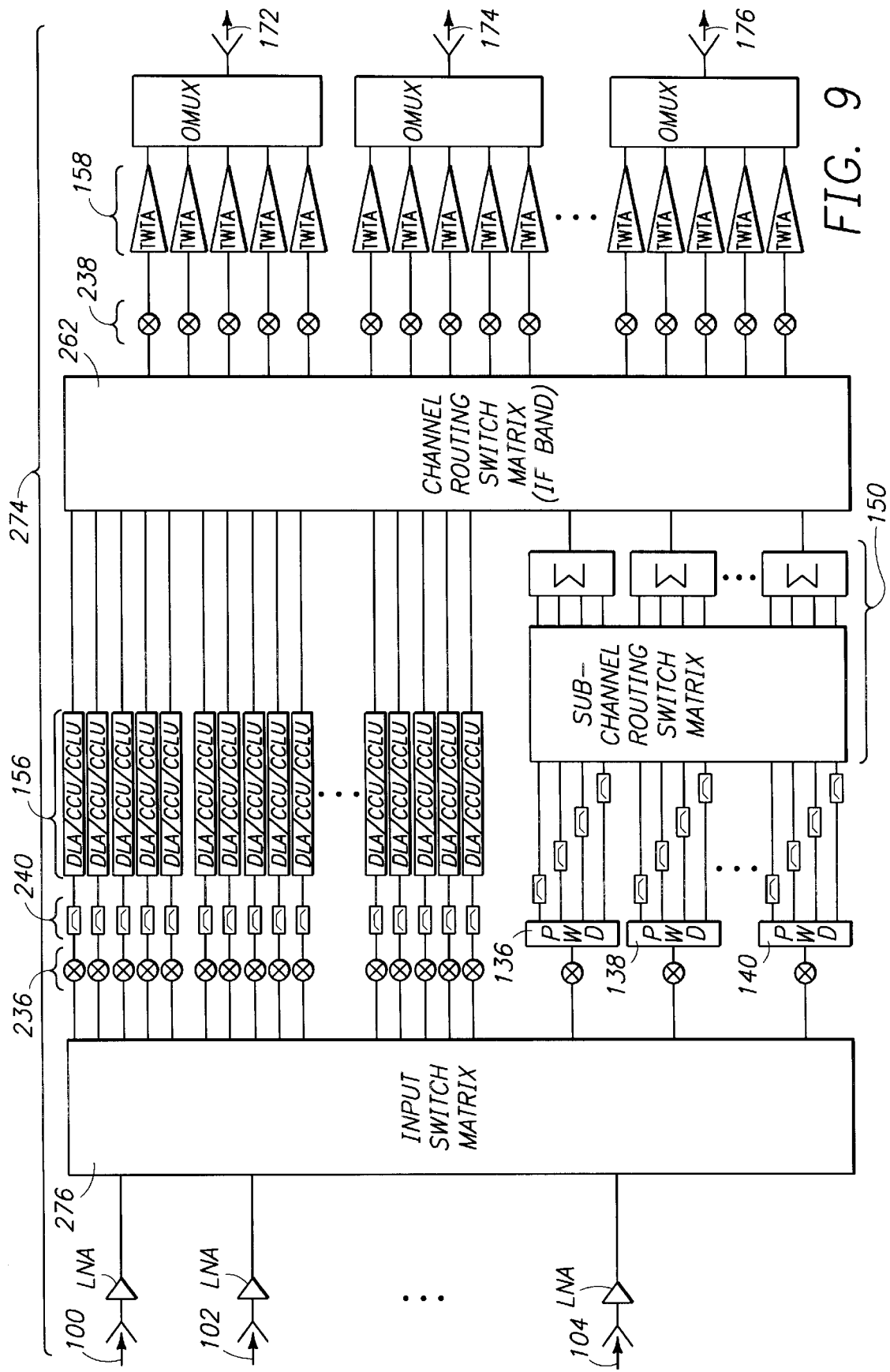
FIG. 9 illustrates a first embodiment of a repeater system of the present invention that allows for multiple subchannel slots in an uplink or downlink beam signal.

FIG. 9 illustrates a first embodiment of a repeater system of the present invention that allows for multiple subchannel slots in an uplink or downlink beam signal.

Repeater system 274 now uses an input switch matrix 276 instead of power dividers to pass uplink beam signals 100–104 to the downconveter mixers 236 and the subchannel routing switch matrix 150. The configuration of repeater system 274 allows for a given uplink beam signal 100 to be routed to multiple power dividers 136–140 which are coupled to the subchannel routing switch matrix 150. For example, uplink beam signal 100 can now be routed to both power dividers 136 and 140, whereas other configurations allowed uplink beam signal 100 to be routed only to one power divider, e.g., power divider 136.

The input switch matrix 276 gives repeater system 274 the capability of having two or more channel allocations on a single uplink beam channel 100 to have subchannel information. If a single uplink beam signal 100 can contain multiple subchannel allocations, the flexibility of the repeater system 276 is again increased, and allows for additional programming to be delivered to diverse geographical locations via downlink beam signals 172–176.

Figure 10:
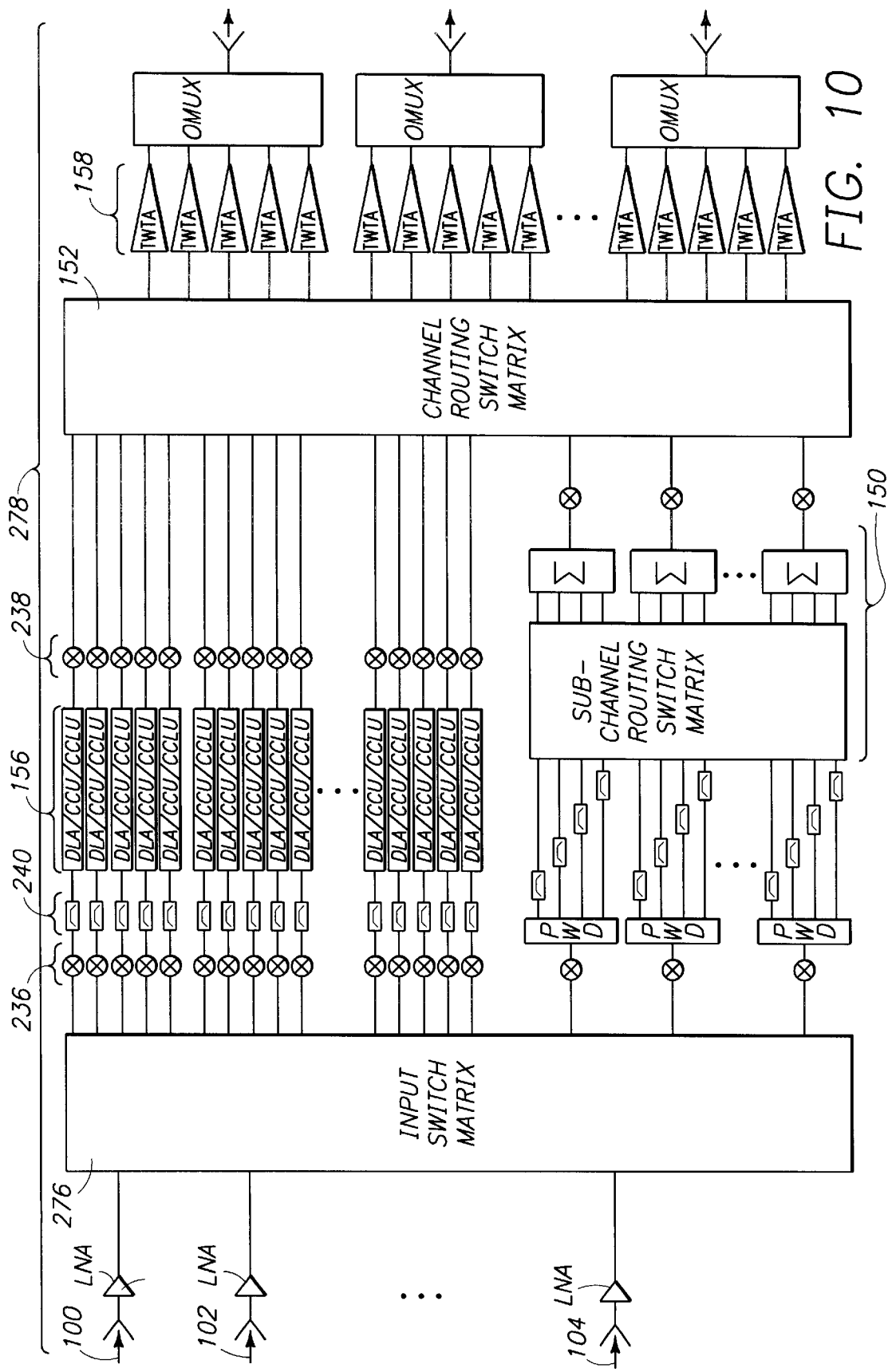
FIG. 10 illustrates a second embodiment of a repeater system of the present invention that allows for multiple subchannel slots in an uplink or downlink beam signal.

FIG. 10 illustrates a second embodiment of a repeater system of the present invention that allows for multiple subchannel slots in an uplink or downlink beam signal.

The repeater system 278 uses a high frequency channel routing switch matrix 152 instead of an IF channel routing switch matrix 262 as shown in FIG. 9. The repeater system 278 of FIG. 10 is related to the repeater system 228 described in FIG. 5, whereas the repeater system 274 of FIG. 9 is related to the repeater system 262 of FIG. 7.

Figure 11:
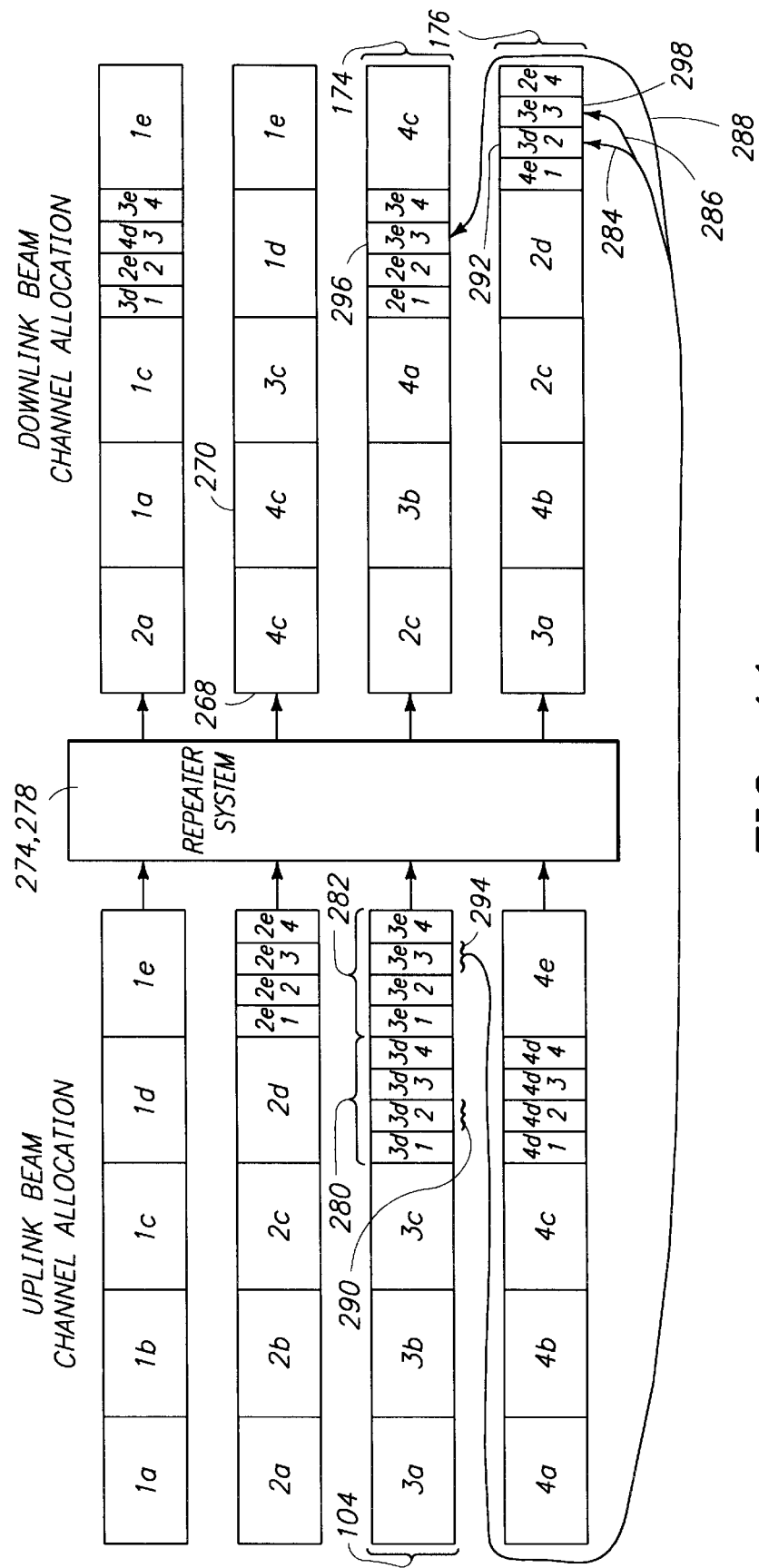
FIG. 11 illustrates the connectivity of the system of the present invention as described in FIGS. 9 and 10.

FIG. 11 illustrates the connectivity of the system of the present invention as described in FIGS. 9 and 10.

The repeater systems 274 and 278 allow for a single uplink beam channel, i.e., uplink beam signal 104, to contain multiple channel allocations for subchannel information. As shown in FIG. 11, uplink beam signal 104 has beam 3 Channel D 280 and beam 3 Channel E 282 that are both divided into subchannel segments. The uplink beam signal 104 is cross-correlated to downlink beam signals 174 and 176 via broadcast paths 284–288. Beam 3 Channel D subchannel 2 290 is broadcast via broadcast path 284 into beam 4, slot E subchannel 2 292. This shows that repeater systems 274 and 278 can frequency translate a subchannel, since the uplink subchannel was "translated" from Channel D to slot (Channel) E.

Beam 3 Channel E subchannel 3 294 is broadcast via broadcast path 286 into beam 3 slot D subchannel 3 296 and beam 4 slot E subchannel 3 298 simultaneously. This shows that repeater systems 274 and 278 can frequency translate and simultaneously perform multiple broadcasts of a single subchannel.

Flowchart

Figure 12:
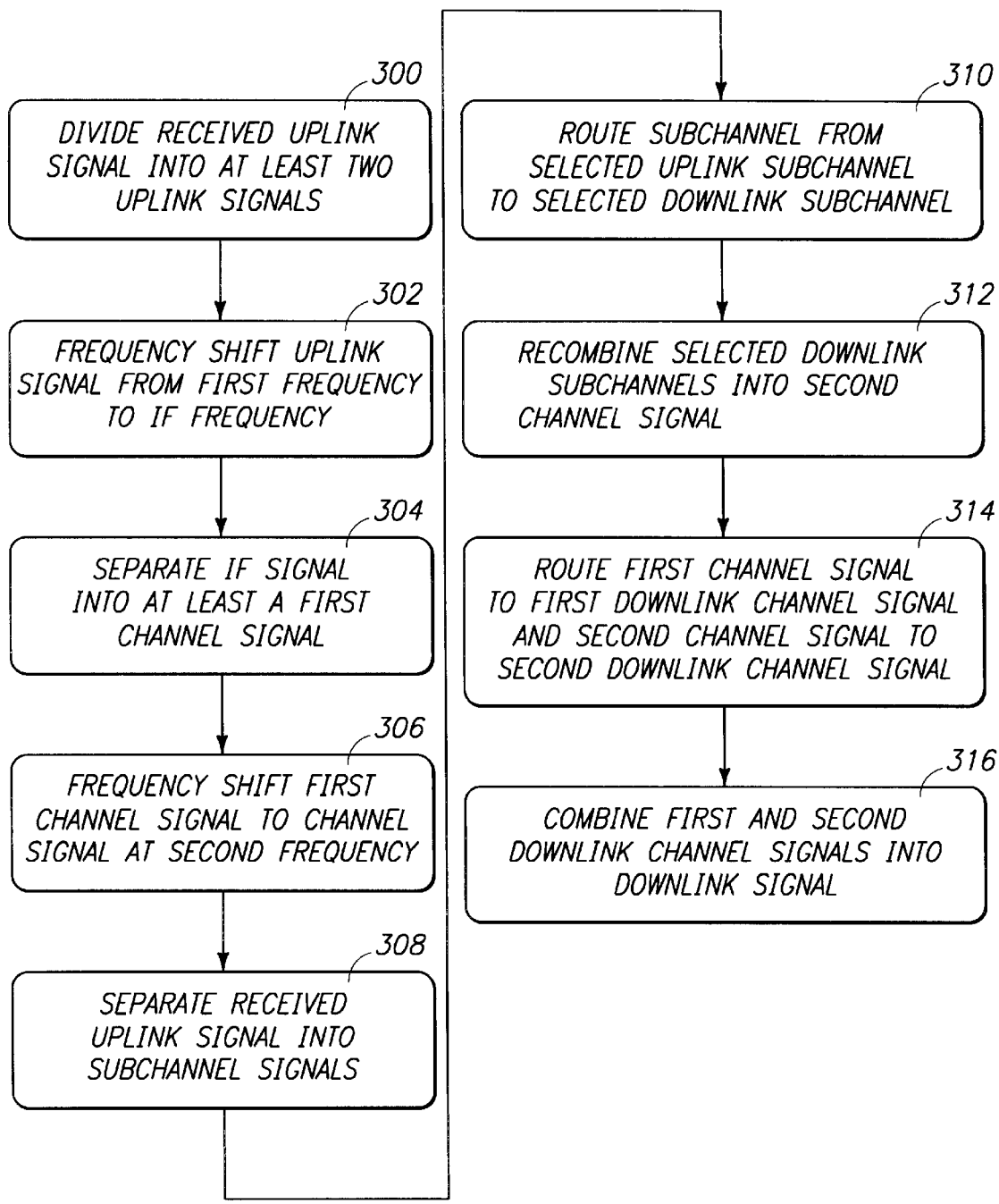
FIG. 12 is a flowchart illustrating the steps used in practicing the present invention.

FIG. 12 is a flowchart illustrating the steps used to practice the present invention.

Block 300 illustrates the present invention performing the step of dividing the uplink signal beam into at least two uplink signals.

Block 302 illustrates the present invention performing the step of frequency shifting the uplink signal from a frequency of the uplink signal beam to an intermediate frequency (IF) signal having an IF frequency.

Block 304 illustrates the present invention performing the step of separating the IF signal into at least a first channel signal at the IF frequency.

Block 306 illustrates the present invention performing the step of frequency shifting the first channel signal at the IF frequency to a channel signal at a second frequency.

Block 308 illustrates the present invention performing the step of separating the uplink signal beam into at least one subchannel signal.

Block 310 illustrates the present invention performing the step of routing the subchannel from a selected uplink subchannel into at least one selected downlink subchannel.

Block 312 illustrates the present invention performing the step of recombining the selected downlink subchannels into a second channel signal.

Block 314 illustrates the present invention performing the step of routing the first channel signal into a first downlink channel signal and the second channel signal into a second downlink channel signal.

Block 316 illustrates the present invention performing the step of combining the first and second downlink channel signals into a downlink signal.

CONCLUSION

This concludes the description of the preferred embodiment of the invention. The following paragraphs describe some alternative methods of accomplishing the same objects.

Although shown as separate configurations, the repeater configurations can be dynamically arranged, e.g., input switch matrix 276 can be selectively switched in and out of the configuration to allow for the flexibility that input switch matrix provides. Other dynamic rearrangement of the repeater systems shown is possible.

Further, although discussed with respect to radio frequency transmissions, the above described invention can also be used with optical or other information carrying transmission systems to perform the same or similar functions.

In summary, a dynamic repeater configuration has been described which enables further flexibility in allocation of uplink channel information into downlink RF beam signals.

A dynamic repeater configuration for satellite systems is disclosed that allows for multiple broadcast of channel information and multiple subchannel allocations on uplink and downlink beam signals. The apparatus comprises an input multiplexer, a subchannel routing switch matrix, a channel routing switch matrix, and an output multiplexer. The input multiplexer receives the uplink signal and produces at least a first channel signal therefrom. The subchannel routing switch matrix receives the uplink signal, separates at least one channel signal into at least one subchannel, routes the subchannel from a selected uplink subchannel into a selected downlink subchannel, and recombines the selected downlink subchannels into a second channel signal. The channel routing switch matrix routes the first channel signal into a first downlink channel signal and the second channel signal into a second downlink channel signal. The output multiplexer combines the first and second downlink channels into the downlink signal.

As further flexibility in the repeater system becomes necessary, additional hardware can be added, or the configuration can be rearranged, to allow for the uplink and downlink channels and subchannels to be reconfigured as desired.

The foregoing description of the preferred embodiment of the invention has been presented for the purposes of illustration and description and is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A dynamic repeater apparatus for interconnecting communication channels and subchannels between an uplink signal and a downlink signal, comprising:
    an input multiplexer for receiving the uplink signal and for producing at least a first channel signal therefrom;
    a subchannel routing switch matrix for receiving the uplink signal, for separating at least one channel signal into at least one subchannel, for routing the subchannel from a selected uplink subchannel into a selected downlink subchannel, and for recombining the selected downlink subchannels into a second channel signal; and
    a channel routing switch matrix, coupled to the input multiplexer through a first input and coupled to the subchannel routing switch matrix through a second input, for routing the first channel signal into a first downlink channel signal and the second channel signal into a second downlink channel signal; and
    an output multiplexer for collecting the first and second downlink channels and combining them into the downlink signal.

2. The repeater apparatus of claim 1, wherein the communication channels are transmitted at radio frequencies.

3. The repeater apparatus of claim 1, wherein the subchannel routing switch matrix separates multiple channel signals into multiple subchannel signals and recombines the multiple subchannel signals into selected multiple downlink channel signals.

4. The repeater apparatus of claim 3, wherein the downlink signal contains subchannel signals in more than one downlink channel.

5. A dynamic repeater apparatus for interconnecting communication channels and subchannels between a uplink receive signal and a downlink signal, comprising:
    a power divider, for receiving the uplink receive signal and for dividing the uplink receive signal into at least two uplink signals;
    a common intermediate frequency (IF) unit, comprising:
        (1) a downconverting mixer, for frequency shifting the uplink signal from a frequency of the uplink receive signal to an intermediate frequency (IF) signal having an IF frequency;
        (2) a filter, for separating the IF signal into at least a first channel signal at the IF frequency; and
        (3) an upconverting mixer, for frequency shifting the first channel signal at the IF frequency to a channel signal at a second frequency;
    a subchannel routing switch matrix for receiving the uplink receive signal, for separating the uplink receive signal into at least one subchannel signal, for routing the subchannel signal from a selected uplink subchannel into at least one selected downlink subchannel, and for recombining the selected downlink subchannels into a second channel signal;
    a channel routing switch matrix, coupled to the common IF unit through a first input of the channel routing switch matrix and coupled to the subchannel routing switch matrix through a second input of the channel routing switch matrix, for routing the first channel signal into a first downlink channel signal and for routing the second channel signal into a second downlink channel signal; and
    an output multiplexer for collecting the first and second downlink channel signals and combining them into a downlink signal.

6. The repeater system of claim 5, wherein the channel routing switch matrix is coupled to the common IF unit at an output of the filter, wherein the channel routing switch matrix routes the first channel signal into a first downlink channel signal and routes the second channel signal into a second downlink channel signal at the IF frequency.

7. The repeater system of claim 6, further comprising an input switch matrix, coupled between the uplink receive signal and the common IF unit, for coupling the uplink receive signal to a selected downconverter mixer.

8. The repeater system of claim 7, wherein the channel routing switch matrix routes the first channel signal into the first downlink channel signal and a third downlink channel signal substantially simultaneously.

9. The repeater system of claim 5, further comprising an input switch matrix, coupled between the uplink receive signal and the common IF unit, for coupling the uplink receive signal to a selected downconverter mixer.

10. The repeater system of claim 9, wherein the channel routing switch matrix routes the first channel signal into the first downlink channel signal and a third downlink channel signal substantially simultaneously.

11. A method for interconnecting communication channels and subchannels between an uplink receive signal and a downlink signal, comprising the steps of:
    dividing the uplink receive signal into at least two uplink signals;
    frequency shifting the uplink signal from a frequency of the uplink receive signal to an intermediate frequency (IF) signal having an IF frequency;
    separating the IF signal into at least a first channel signal at the IF frequency;
    frequency shifting the first channel signal at the IF frequency to a channel signal at a second frequency;
    separating the uplink receive signal into at least one subchannel signal;

routing the subchannel from a selected uplink subchannel into at least one selected downlink subchannel;

recombining the selected downlink subchannels into a second channel signal;

routing the first channel signal into a first downlink channel signal and the second channel signal into a second downlink channel signal; and combining the first and second downlink channel signals into a downlink signal.

12. The method of claim 11, wherein the communication channels are transmitted at radio frequencies.

13. The method of claim 11, wherein the step of separating separates multiple channel signals into multiple subchannel signals and the step of recombining recombines the multiple subchannel signals into selected multiple downlink channel signals.

14. The method of claim 13, wherein the downlink signal contains subchannel signals in more than one downlink channel.

* * * * *